(12) United States Patent
Horvath (10) Patent No.: US 9,909,906 B2
(45) Date of Patent: Mar. 6, 2018

(54) INDICATING DEVICE WITH DIAL PLATE HAVING GROOVES

(71) Applicants: DENSO International America, Inc., Southfield, MI (US); DENSO CORPORATION, Kariya, Aichi-pref. (JP)

(72) Inventor: Cary Horvath, Dearborn, MI (US)

(73) Assignees: DENSO International America, Inc., Southfield, MI (US); DENSO CORPORATION, Kariya (JP)

(*) Notice: Subject to any disclaimer, the term of this patent is extended or adjusted under 35 U.S.C. 154(b) by 196 days.

(21) Appl. No.: 15/135,710

(22) Filed: Apr. 22, 2016

(65) Prior Publication Data

US 2017/0307422 A1    Oct. 26, 2017

(51) Int. Cl.
*G01D 13/04*    (2006.01)
*G01D 13/22*    (2006.01)
*G01D 13/26*    (2006.01)

(52) U.S. Cl.
CPC ........... *G01D 13/265* (2013.01); *G01D 13/04* (2013.01)

(58) Field of Classification Search
CPC ........ G01D 11/28; G01D 13/02; G01D 13/04; G01D 13/22; G01D 13/26; G01D 13/265; G01D 13/28
USPC ............ 116/286, 287, 288, DIG. 6, DIG. 36; 362/23.01, 23.11–23.22
See application file for complete search history.

(56) References Cited

U.S. PATENT DOCUMENTS

| | | | | |
|---|---|---|---|---|
| 2,009,209 A | * | 7/1935 | Scantlebury | G04B 19/30 116/287 |
| 6,379,015 B2 | * | 4/2002 | Wilhelm et al. | G01D 11/28 116/284 |
| 7,097,316 B2 | * | 8/2006 | Sumiyoshi | B60K 37/02 116/246 |
| 7,448,341 B2 | * | 11/2008 | Cook et al. | G01D 11/28 116/286 |
| 7,779,774 B2 | * | 8/2010 | Liu | B60K 37/02 116/284 |
| 7,928,859 B1 | * | 4/2011 | Li et al. | B60K 37/02 116/284 |
| 7,934,463 B2 | * | 5/2011 | Cook | B60K 35/00 116/286 |
| 2006/0185576 A1 | | 8/2006 | Tane | |
| 2009/0160090 A1 | * | 6/2009 | Suzuki | G01D 11/28 264/293 |
| 2016/0185034 A1 | * | 6/2016 | Sano | G01D 13/04 264/496 |
| 2017/0282716 A1 | * | 10/2017 | Mochizuki et al. | B60Q 3/14 |

FOREIGN PATENT DOCUMENTS

| | | | | | |
|---|---|---|---|---|---|
| JP | 05026698 A | * | 2/1993 | | G01D 11/28 |
| JP | H0523047 U | * | 3/1993 | | G01D 13/04 |
| JP | 08193852 A | * | 7/1996 | | G01D 11/28 |
| JP | 2002162259 A | * | 6/2002 | | G01D 11/28 |

(Continued)

*Primary Examiner* — R. A. Smith (57) ABSTRACT

A dial plate is in a disc shape. A pointer body is located at a center of the dial plate and rotational relative to the dial plate. The dial plate has a plurality of grooves extending radially outward from the center. The pointer body is configured to emit light radially outward to illuminate one of the grooves to produce a linear illumination extending linearly outward from the pointer body.

17 Claims, 13 Drawing Sheets

(56) References Cited

FOREIGN PATENT DOCUMENTS

| JP | 2005181017 A | * | 7/2005 | ............ G01D 13/22 |
| JP | 2003215142 A | * | 7/2006 | ............ G01D 11/28 |
| JP | 2015036637 A | * | 2/2015 | ............ G01D 13/22 |
| WO | WO 2015045320 A1 | * | 4/2015 | ............ G01D 11/28 |

* cited by examiner

FIG. 1

VERTICAL
(AXIAL)

RADIAL

CIRCUMFERENTIAL

INDICATING DEVICE WITH DIAL PLATE HAVING GROOVES

TECHNICAL FIELD

The present disclosure relates to an indicating device with a dial plate having multiple grooves.

BACKGROUND

Conventionally, an indicating device such as a dial gauge includes a pointer rotational to indicate information such as a speed or an engine revolution of a vehicle. A conventional pointer may include a pointer needle extending linearly outward. An indicating device may have a different structure from such a conventional pointer to specify information.

SUMMARY

According to an aspect of the preset disclosure, an indicating device may comprise a dial plate in a disc shape. The indicating device may further comprise a pointer body located at a center of the dial plate and rotational relative to the dial plate. The dial plate may have a plurality of grooves extending radially outward from the center. The pointer body may be configured to emit light radially outward to illuminate one of the grooves to produce a linear illumination extending linearly outward from the pointer body.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

First Embodiment

As follows, an indicating device 1 will be described with reference to drawings. In drawing(s), "VERTICAL" may correspond to a vertical direction. "AXIAL" may correspond to an axial direction. "RADIAL" may correspond to a radial direction. "CIRCUMFERENTIAL" may correspond to a circumferential direction.

Figure 1:
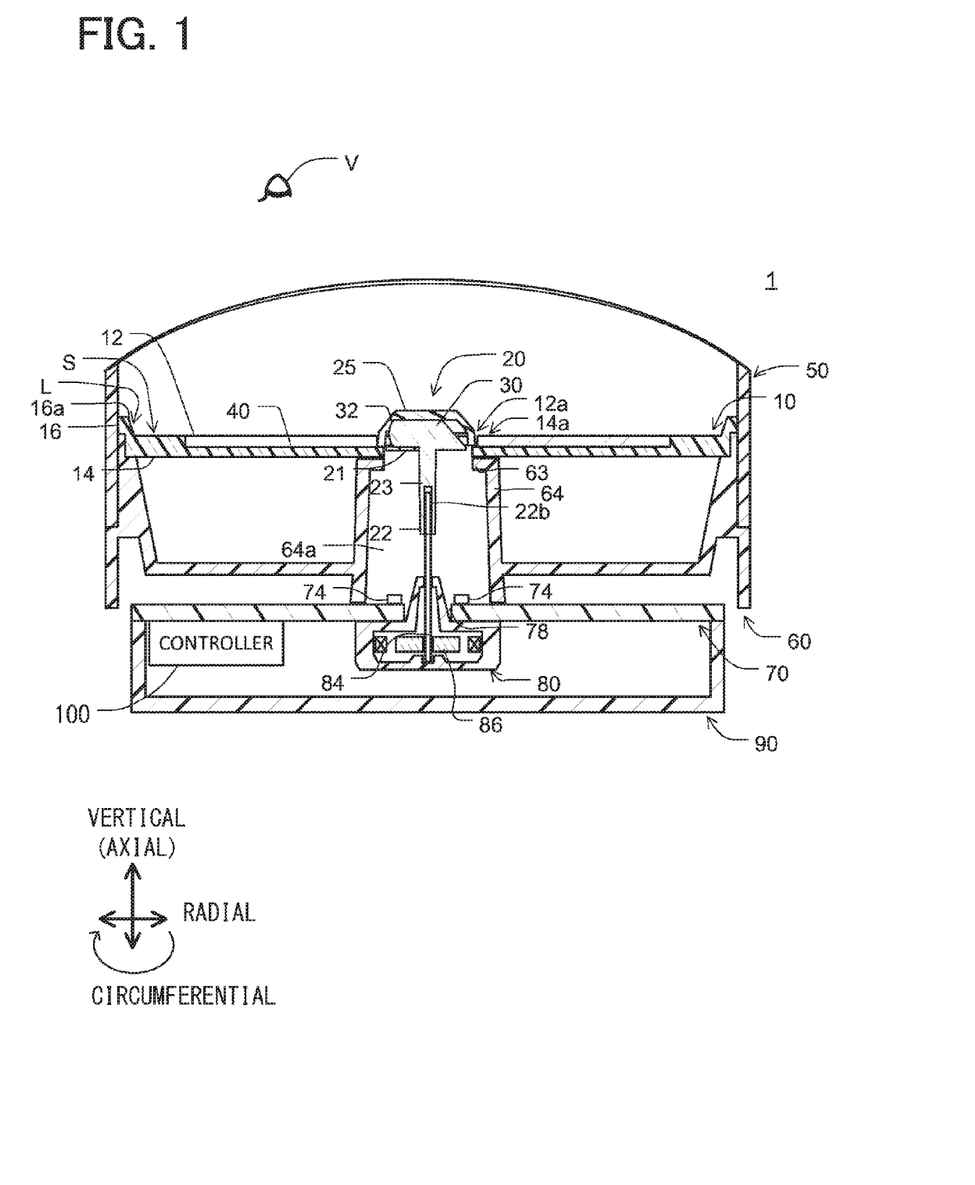
FIG. 1 is a sectional view showing an indicating device.

In FIG. 1, the indicating device 1 is, for example, an engine revolution meter for an automobile. The indicating device 1 includes a dial plate 10, a pointer body 20, a dial cover 50, a main housing 60, a printed circuit board (PCB) 70, a driver unit 80, a rear housing 90, and a controller 100.

The dial plate 10 has a display surface facing a viewer V such as an occupant of an automobile. The dial plate 10 is in a circular shape when viewed from the viewer V. The dial plate 10 includes a groove plate 12 and a base plate 14. The groove plate 12 and the base plate 14 are in disc shapes, respectively. In the present example, the groove plate 12 may be formed of a non-opaque material such as polycarbonate resin. The base plate 14 may be formed of an opaque material such as ABS resin. The groove plate 12 has a groove-plate center hole 12a at its center. The base plate 14 has a base-plate center hole 14a at its center. The groove-plate center hole 12a is greater than the base-plate center hole 14a in diameter. The base plate 14 has a recess formed on the side of the display surface. The groove plate 12 is affixed to the recess of the base plate 14. Thus, the groove plate 12 is located coaxial with the base plate 14, and the groove-plate center hole 12a is located coaxial with the base-plate center hole 14a.

The groove plate 12 has multiple grooves 40 extending from the groove-plate center hole 12a outward in the radial direction. Each of the grooves 40 may be reflective when receiving light. Specifically, the groove 40 may be coated and/or plated with reflective material. For example, the groove 40 may be applied with chrome plating and/or may be equipped with a metallic foil by hot stamping. The groove 40 may be polished to have a smooth surface having reflectivity. Each of the grooves 40 may form a pointer needle when receiving light.

The base plate 14 has indication marks such as a dial gauge and symbols S to form a gauge meter. The symbols S may be numbers denoting the engine revolution. The symbols S may be formed correspondingly to the grooves 40.

The base plate 14 has a brim 16 located on its radially outside. The brim 16 is raised from the outer circumferential periphery of the base plate 14 to have an inclined surface 16a. The inclined surface 16a is opposed to the pointer body 20 in the radial direction. The brim 16 has multiple light points L. Each of the light points L may be an illuminative mark. The light point L may be formed by, for example, painting fluorescent pigment on the inclined surface 16a and/or embedding fluorescent object in the inclined surface 16a. The light point L is illuminated when receiving light emitted from the pointer body 20. The light points L may be formed correspondingly to the grooves 40.

The dial cover 50 is a tubular member placed coaxial with the dial plate 10. The pointer body 20 is equipped to the dial plate 10 such that a bottom portion of the pointer body 20 is partially stuck in the dial plate 10. The bottom portion of the pointer body 20 is located inside the groove-plate center hole 12a and is located above the base-plate center hole 14a.

The pointer body 20 includes a pointer shaft 23, a light conductor 30, a cover 25, and a shield 21. The light conductor 30 has a lens 32 at its tip end. The lens 32 is located above the base-plate center hole 14a. The pointer shaft 23 extends through the base-plate center hole 14a. The cover 25 and the shield 21 are coupled with the light conductor 30 to enclose the light conductor 30.

The PCB 70 is located between the main housing 60 and the rear housing 90. The PCB 70 has a center hole 78 at its center. The PCB 70 is further equipped with light emitting diodes (LED, light source) 74 around the center hole 78. The PCB 70 may be equipped with electronic wirings and electronic devices such as the controller 100. The controller 100 may be a microcomputer including a CPU, a storage unit such as a RAM and ROM, which are connected with an internal bus. The controller 100 may be configured to execute a computer program to implement various processings thereby to control components such as the LED 74.

The driver unit 80 is equipped to the PCB 70. For example, the driver unit 80 may be soldered to the PCB 70. The driver unit 80 may be an electric motor such as a stepper motor. The driver unit 80 includes a drive shaft 84 and a motor portion 86. The drive shaft 84 is coupled with a rotor of the motor portion 86. The motor portion 86 includes a stator configured to receive electricity from a controller (not shown) via the wiring of the PCB 70 to generate a magnetic field and to drive the drive shaft 84 via the rotor. The driver unit 80 may be equipped with reduction gears combined with the motor portion 86.

The pointer shaft 23 has a pointer end 22 in the axial direction. The pointer end 22 has a drive shaft hole 22b into which the drive shaft 84 is inserted. Thus, the drive shaft 84 is coupled with the pointer shaft 23 of the pointer body 20.

The main housing 60 has a housing center 64 defining a tubular hollow 64a. The housing center 64 has a brim 63 extending radially inward toward the pointer shaft 23. The pointer shaft 23 and the drive shaft 84 are partially located in the tubular hollow 64a. The rear housing 90 is equipped to the PCB 70 to accommodate the driver unit 80.

Figure 2:
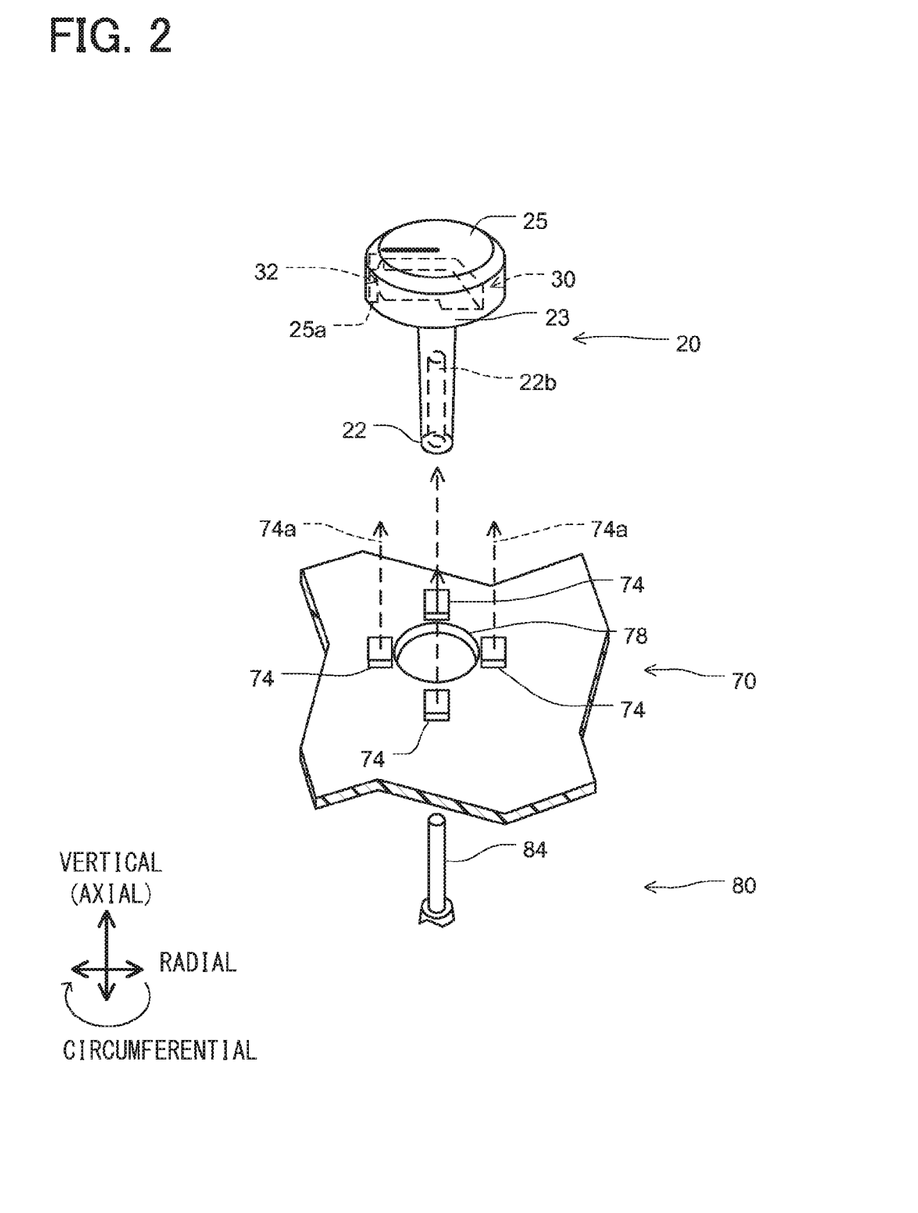
FIG. 2 is a perspective view showing components of the indicating device.

As shown in FIG. 2, the pointer body 20 is connected with the drive shaft 84 through the center hole 78 of the PCB 70. The drive shaft 84 is located to be coaxial with the pointer shaft 23. After the connection, the drive shaft 84 of the driver unit 80 extends through the PCB 70. The LEDs 74 include multiple light source elements 74 located on the radially outside of the drive shaft 84 to surround the drive shaft 84. The LEDs 74 are positioned on the PCB 70, such that a rear side of the pointer body 20 is opposed to optical axes 74a of the LEDs 74.

Figure 3:
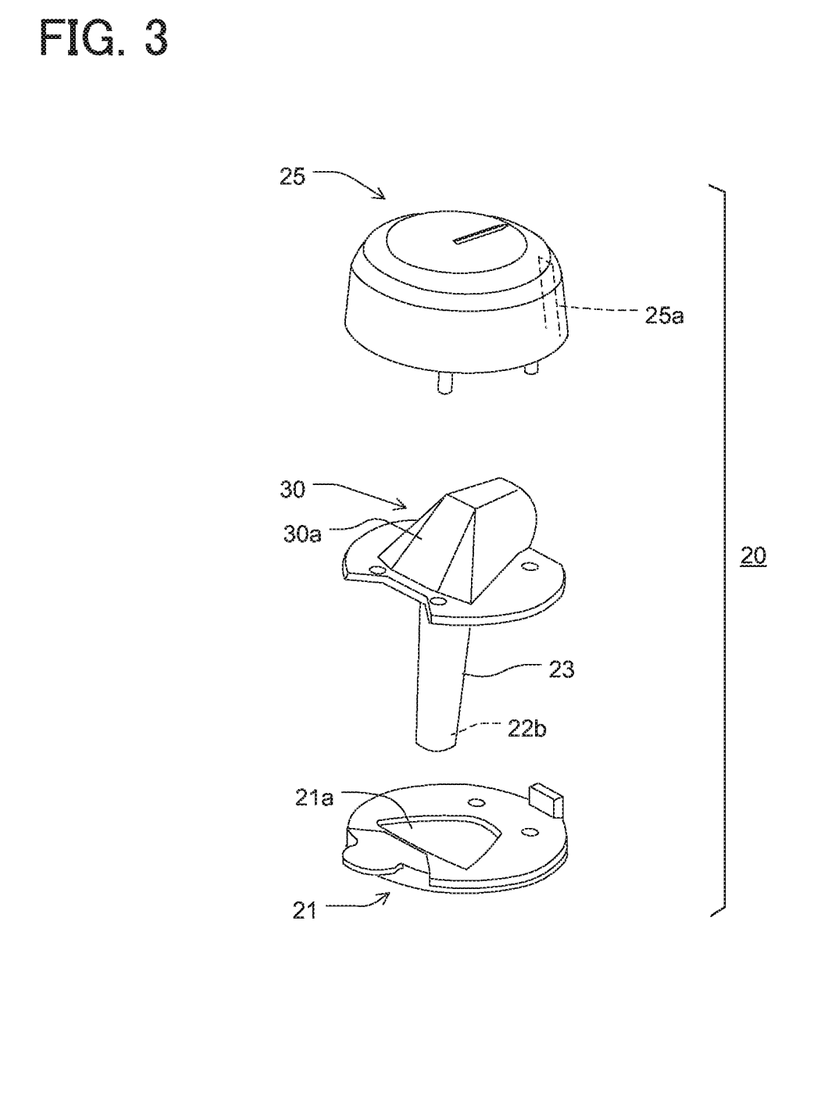
FIG. 3 is an exploded view showing components of a pointer body of the indicating device.

In FIG. 3, the pointer shaft 23 extends from the light conductor 30 downward in the drawing. In the example, the pointer shaft 23 and the light conductor 30 are integrally formed of a non-opaque light-conductive material such as a translucent resin (e.g., polycarbonate resin or PMMA resin). The cover 25 is a hollow component in a dome shape formed of, for example, an opaque material such as ABS resin. The cover 25 has a slit 25a, which is a through hole extending through a side wall of the cover 25. The shield 21 is a disc-shaped member formed of, for example, an opaque material such as ABS resin. The shield 21 has an opening 21a through which the bottom side of the light conductor 30 is partially exposed. The light conductor 30 is mounted onto the shield 21 by inserting the pointer shaft 23 through the opening 21a and snap-fitting the light conductor 30 onto the shield 21. Subsequently, the cover 25 is mounted to the light conductor 30 and the shield 21 by inserting pins of the cover 25 into through holes formed in the light conductor 30 and the shield 21.

Figure 4:
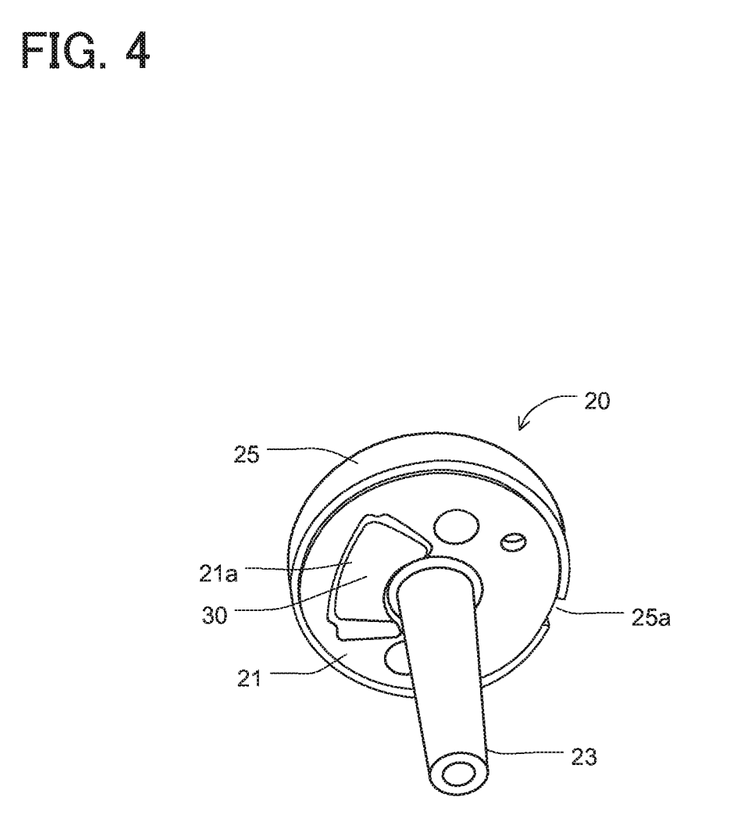
FIG. 4 is a perspective view showing the pointer body viewed from a bottom side.

FIG. 4 shows the pointer body 20 viewed from the bottom side. The shield 21 is located on the bottom side of the light conductor 30, such that the rear side of the light conductor 30 is partially exposed through the opening 21a.

Figure 5:
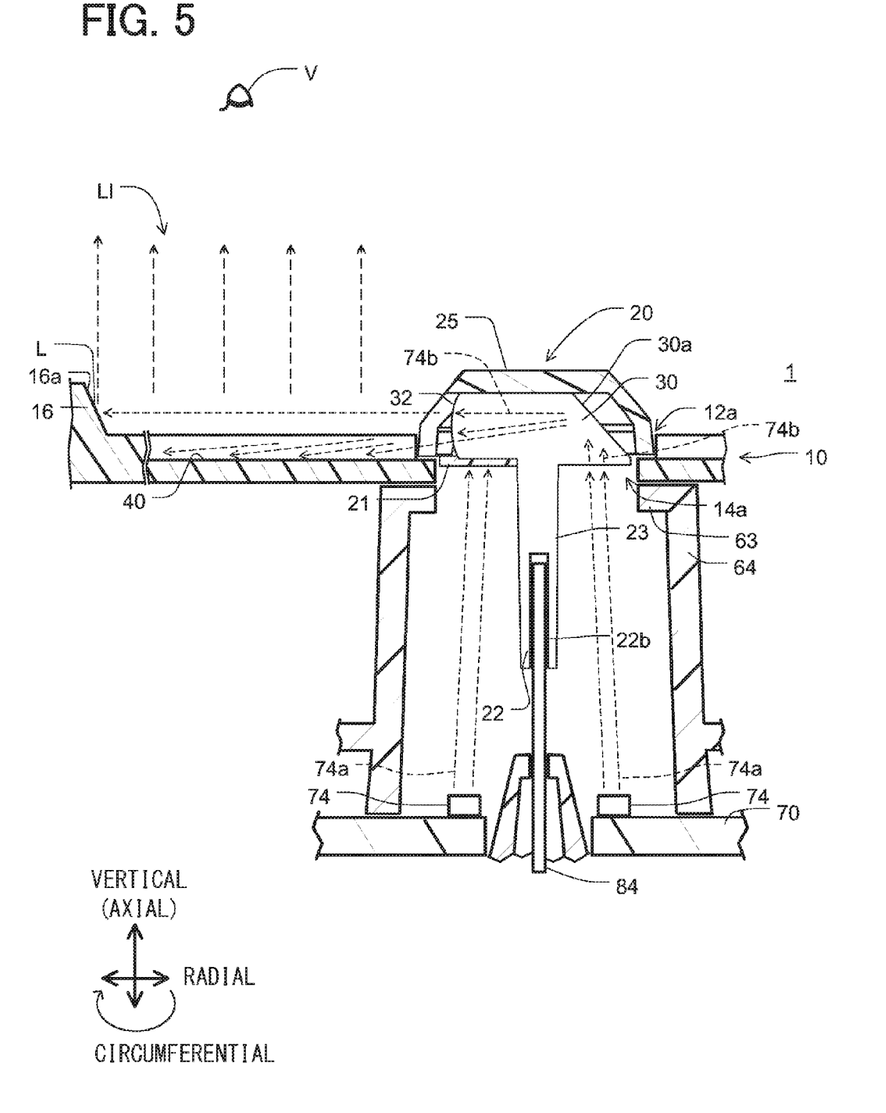
FIG. 5 is an explanatory view showing interior of the indicating device.

As shown in FIG. 5, in the dial plate 10, the groove-plate center hole 12a and the base-plate center hole 14a form a stepped space accommodating the bottom portion of the pointer body 20. In the present structure, the pointer body 20 is partially stuck in the dial plate 10 at the bottom portion, such that a bottom surface of the lens 32 of the light conductor 30 is positioned at the same level as a bottom surface of the groove 40. The light conductor 30 has an angled surface 30a. The angled surface 30a is a flat surface inclined at an angle relative to the axial direction of the drive shaft 84.

When the pointer body 20 is mounted to the drive shaft 84, the LEDs 74 are opposed to the angled surface 30a of the light conductor 30. Thus, the angled surface 30a is enabled to receive light, which is emitted from the LEDs 74 through a rear portion of the light conductor 30.

When each of the LEDs 74 is energized, the LED 74 emits light along an optical axis 74a. The light passes through the rear side of the light conductor 30. In this way, the rear side of the light conductor 30 functions as a light pickup to receive light from the LEDs 74. The light further passes along an optical path 74b through the light conductor 30 toward the angled surface 30a of the light conductor 30. The light is reflected on the angled surface 30a and is directed toward the lens 32, which is at the tip end of the light conductor 30. The lens 32 converges the light toward the grooves 40. In this way, the pointer body 20 is enabled to emit light radially outward to illuminate one of the grooves 40 thereby to produce a linear illumination LI, such that the linear illumination LI extends linearly outward from the pointer body 20. The linear illumination LI caused on the groove 40 is rendered viewable as a pointer needle for the viewer V. The pointer body 20 is further enabled to emit light radially outward to illuminate one of the light points L.

Figure 6:
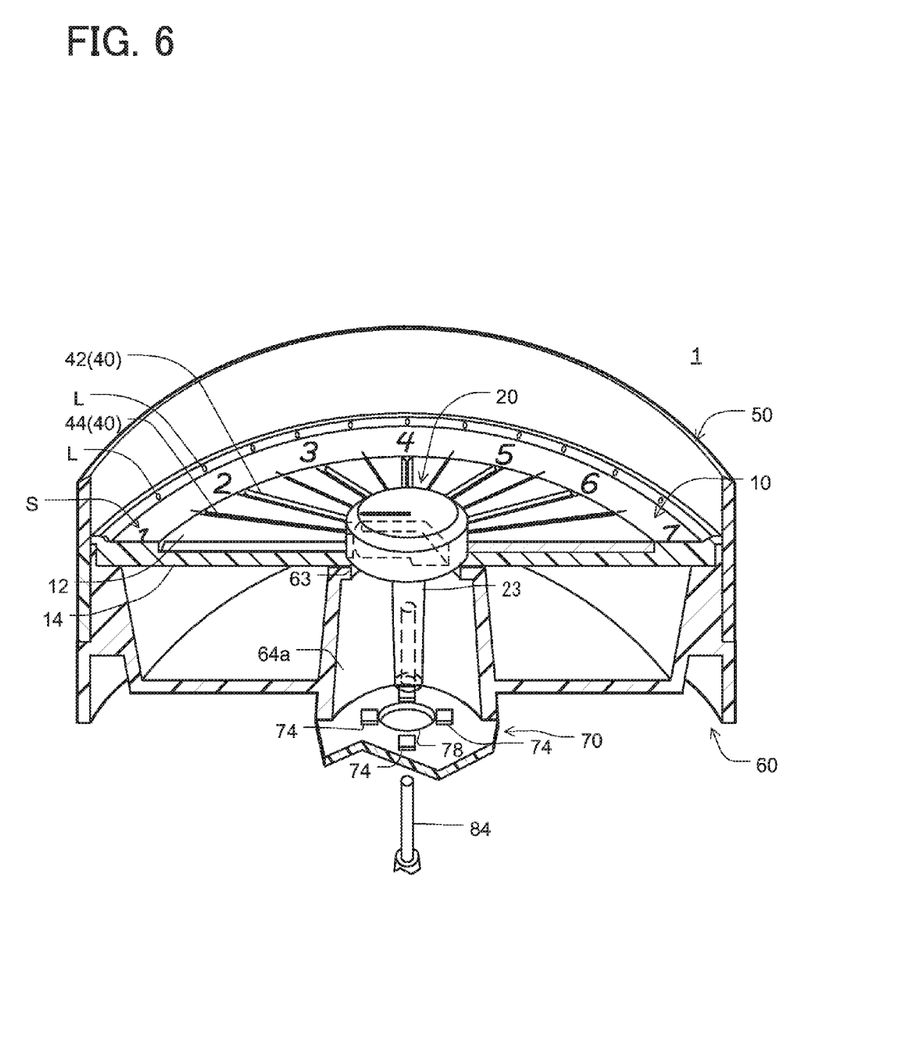
FIG. 6 is a perspective sectional view showing the indicating device.

In FIG. 6, the drive shaft 84 is coupled with the pointer shaft 23 of the pointer body 20 to manipulate the pointer body 20 at an appropriate position. The drive shaft 84 enables to direct the pointer body 20 at one of the grooves 40 on the dial plate 10. The pointer body 20 may be directed to one of the light points L and one of the symbols S.

Figure 7:
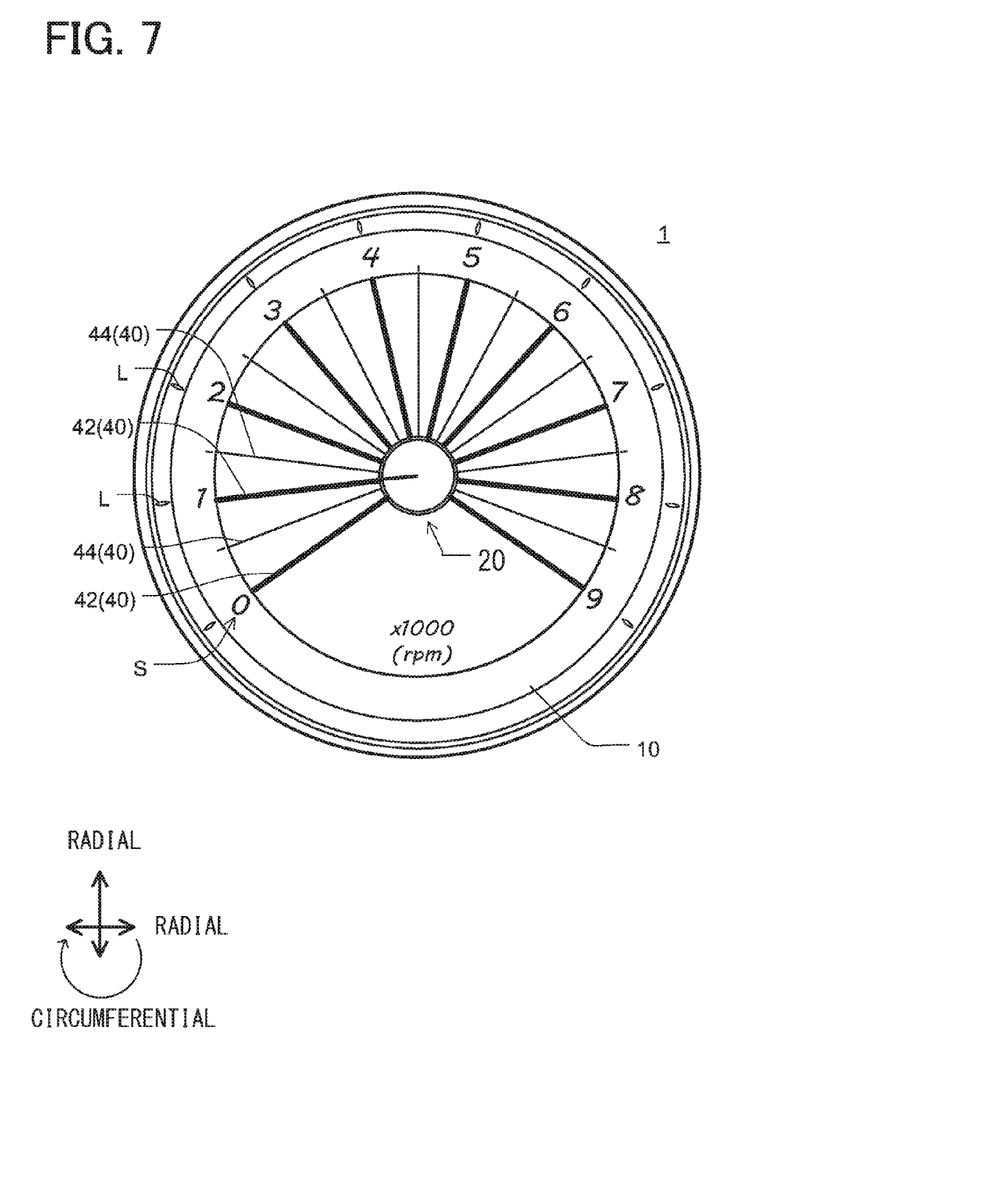
FIG. 7 is an explanatory plan view showing the indicating device.

In FIG. 7, graphical images of the primary grooves 42 and the secondary grooves 44 are exaggeratedly drawn in order to clearly represent the arrangement of the grooves 42 and 44 in the indicating device 1. In an actual structure of the indicating device 1, the primary grooves 42 and the secondary grooves 44 may be hardly viewed from the viewer V unless being emitted with light from the pointer body 20.

Referring to FIGS. 6 and 7, the groove plate 12 has the grooves 40 arranged at angular intervals in the circumferential direction. The grooves 40 include primary grooves 42 and secondary grooves 44. The primary groove 42 is greater than the secondary groove 44 in width. Each of the secondary grooves 44 is located between adjacent two primary grooves 42.

The base plate 14 has the symbols S arranged at angular intervals in the circumferential direction. In the present example, the symbols S correspond to the primary grooves 42, respectively. More specifically, each of the symbols S is located on the radially outside of corresponding one of the primary grooves 42.

The brim 16 of the base plate 14 has the light points L on the inclined surface 16a. The light points L are arranged at angular intervals in the circumferential direction. In the present example, the light points L correspond to the primary grooves 42 and the symbols S, respectively. More specifically, each of the light points L is located on the radially outside of corresponding one of the symbols S.

Figure 8:
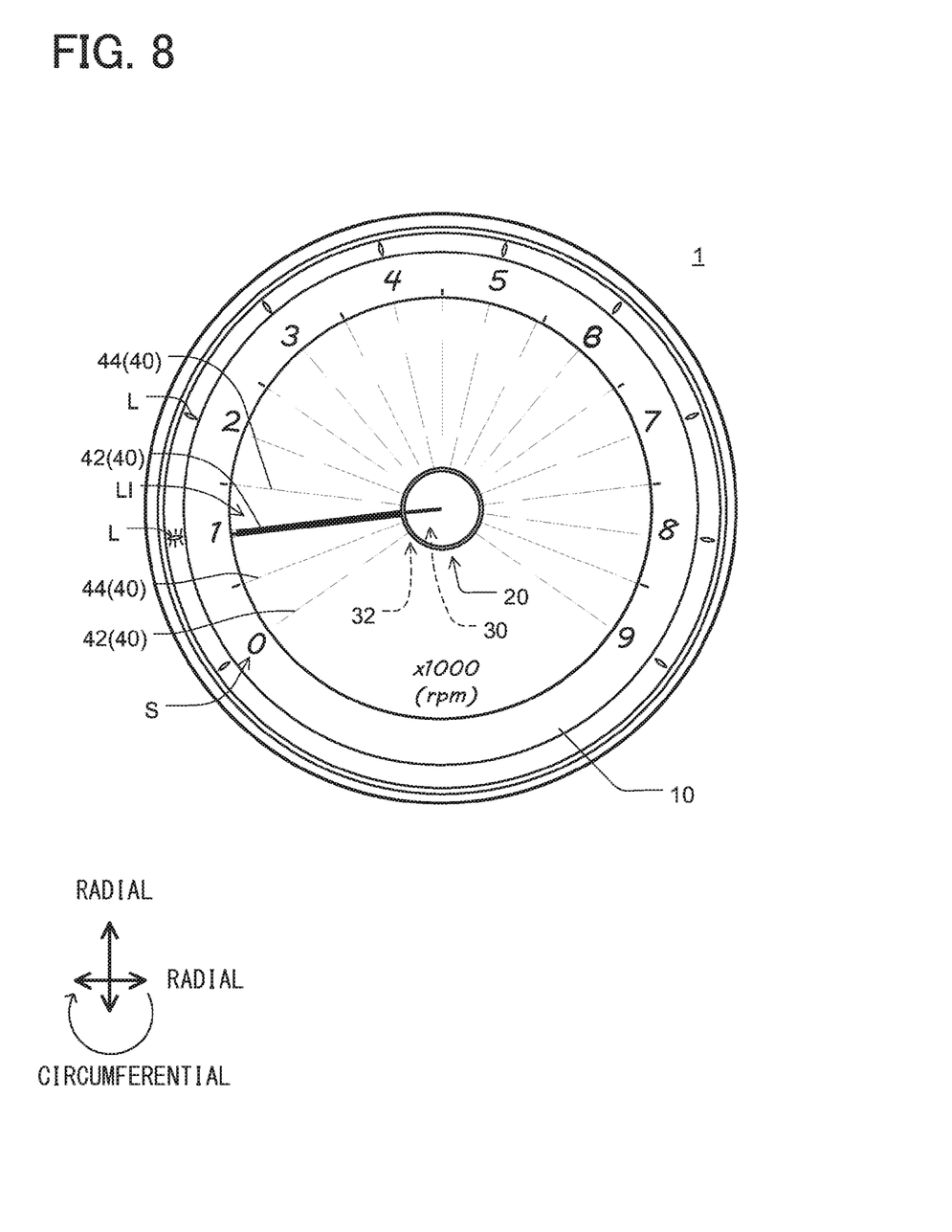
FIG. 8 is a plan view showing the indicating device when the pointer body causes a linear illumination.

As shown in FIG. 8, when the LEDs 74 emit light, the pointer body 20 emits light radially outward. The light illuminates one groove 40, which is located on the radially outside of the lens 32 at the tip end of the light conductor 30, to form the linear illumination LI. The other grooves 40, which are not illuminated with the pointer body 20, are dimmed and less visible compared with the illuminated groove 40. The other grooves 40 may be almost invisible.

As the pointer body 20 rotates, the light conductor 30 sequentially switches one illuminated groove 40 to an adjacent groove 40 to be illuminated in the circumferential direction. The present switching of the groove 40, which is to be illuminated, shows intermittent or continual movement of the linear illumination LI in the circumferential direction. In this way, the linear illumination LI functions as a pointer needle to specify the present engine revolution on the gauge of the indicating device 1. It is noted that, as the number of the grooves 40 increases, the pitch between the grooves 40 becomes finer to reduce intermittence between the grooves 40. In actual structure, one angular range between adjacent grooves 40 may be divided to include multiple fine pitches. For example, this one angular range may include 5 to 50 or more pitches to enable smooth motion of the linear illumination IL in the circumferential direction.

The light from the pointer body 20 further illuminates one light point L located on the radially outside of the one groove 40 to form a pointy illumination. As the pointer body 20 rotates, the light conductor 30 also switches one illuminated light point L to an adjacent light point L to be illuminated in the circumferential direction.

Figure 9:
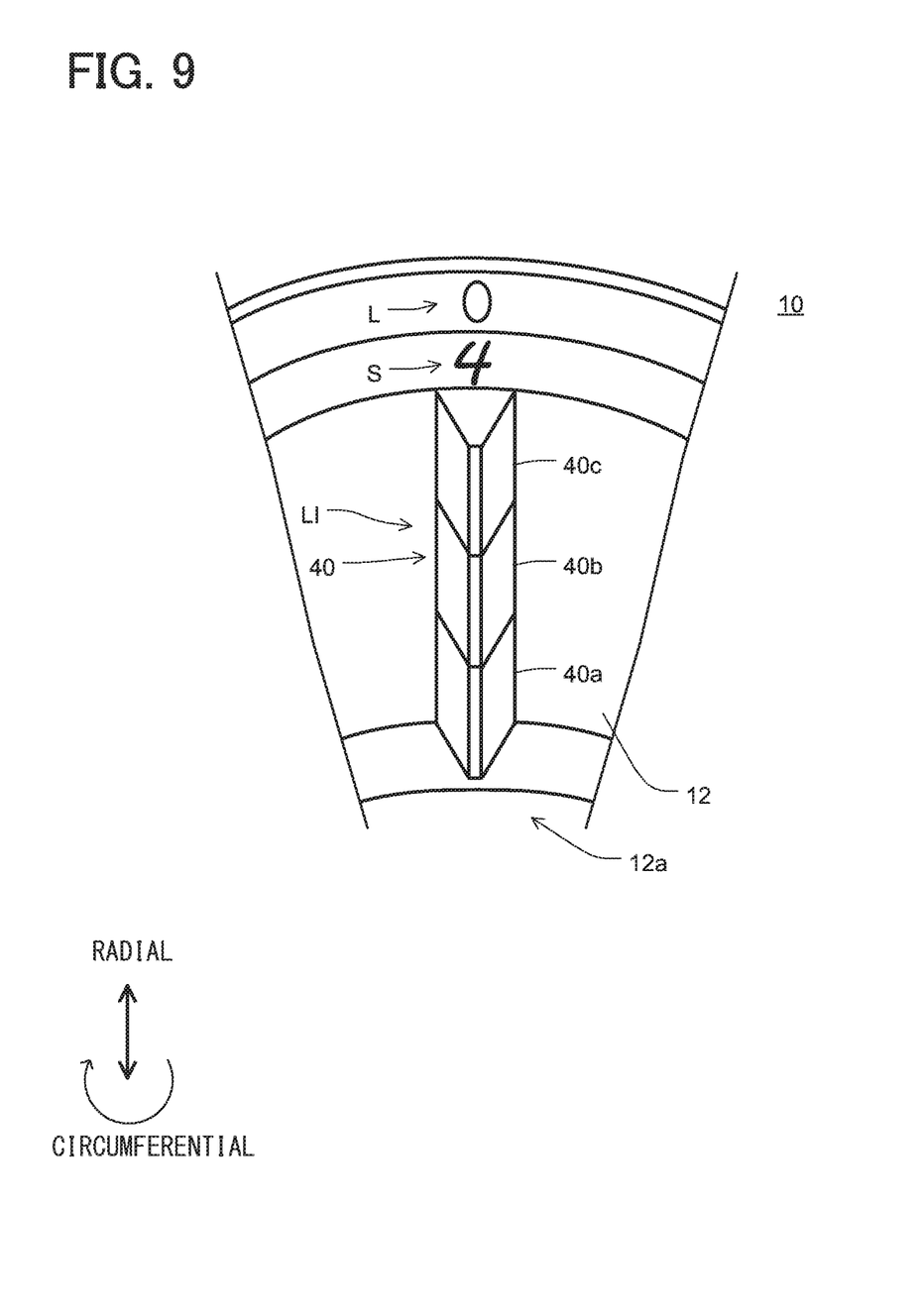
FIG. 9 is a perspective view showing one example of a groove.

As shown in FIG. 9, in the present example, each of the grooves 40 has a cross section in a V-shape. In the present example, the groove 40 opens at one end on the side of the groove-plate center hole 12a of the groove plate 12. In the present example, the groove 40 has a width constant in the radial direction.

The groove 40 may have multiple segments, which are arranged in the radial direction. In the example, the groove 40 has a first segment 40a, a second segment 40b, and a third segment 40c arranged in this order radially outward. The segments 40a to 40c may be different in reflectivity. Specifically, the first segment 40a, the second segment 40b, and the third segment 40c may reduce in reflectively in this order. That is, as being distant from the pointer body 20, the segment becomes less reflective. Therefore, the liner illumination IL produced by illuminating the segments 40a to 40c may be shiny at the center and may get dimmed toward the tip end. The reflectively of the segments 40a to 40c may be modified by differentiating the roughness among the segments 40a to 40c and/or the characteristic of reflective material among the segments 40a to 40c.

The controller 100 may control energization of the LEDs 74 to modify intensity of light emitted from the pointer body 20. In this way, the controller 100 modifies indication of the linear illumination LI formed on the groove 40. Specifically, as the controller 100 reduces an electric power supplied to the LEDs 74, the pointer body 20 reduces intensity of light emitted therefrom. When the controller 100 controls the LEDs 74 at a moderate level to cause the pointer body 20 to emit light at a moderate level, the third segment 40c and/or the second segment 40b may become blur or darker compared with the first segment 40a. As the controller 100 further reduces intensity of light emitted from the pointer body 20, the third segment 40c and/or the second segment 40b may not reflect light to become invisible form the viewer V. Thus, the third segment 40c and/or the second segment 40b do not form a corresponding portion of the liner illumination IL. Consequently, the liner illumination IL reduces its length. Alternatively, as the controller 100 increases intensity of light emitted from the pointer body 20, the liner illumination IL may increases in length. In this way, the controller 100 is configured to control the length of the linear illumination LI by controlling intensity of light emitted from LEDs 74.

In actual structure, the groove 40 may be further divided in the radial direction to include multiple fine segments. For example, one groove 40 may include 5 to 50 or more segments to enable smooth adjustment of the length of the linear illumination IL.

Figure 10:
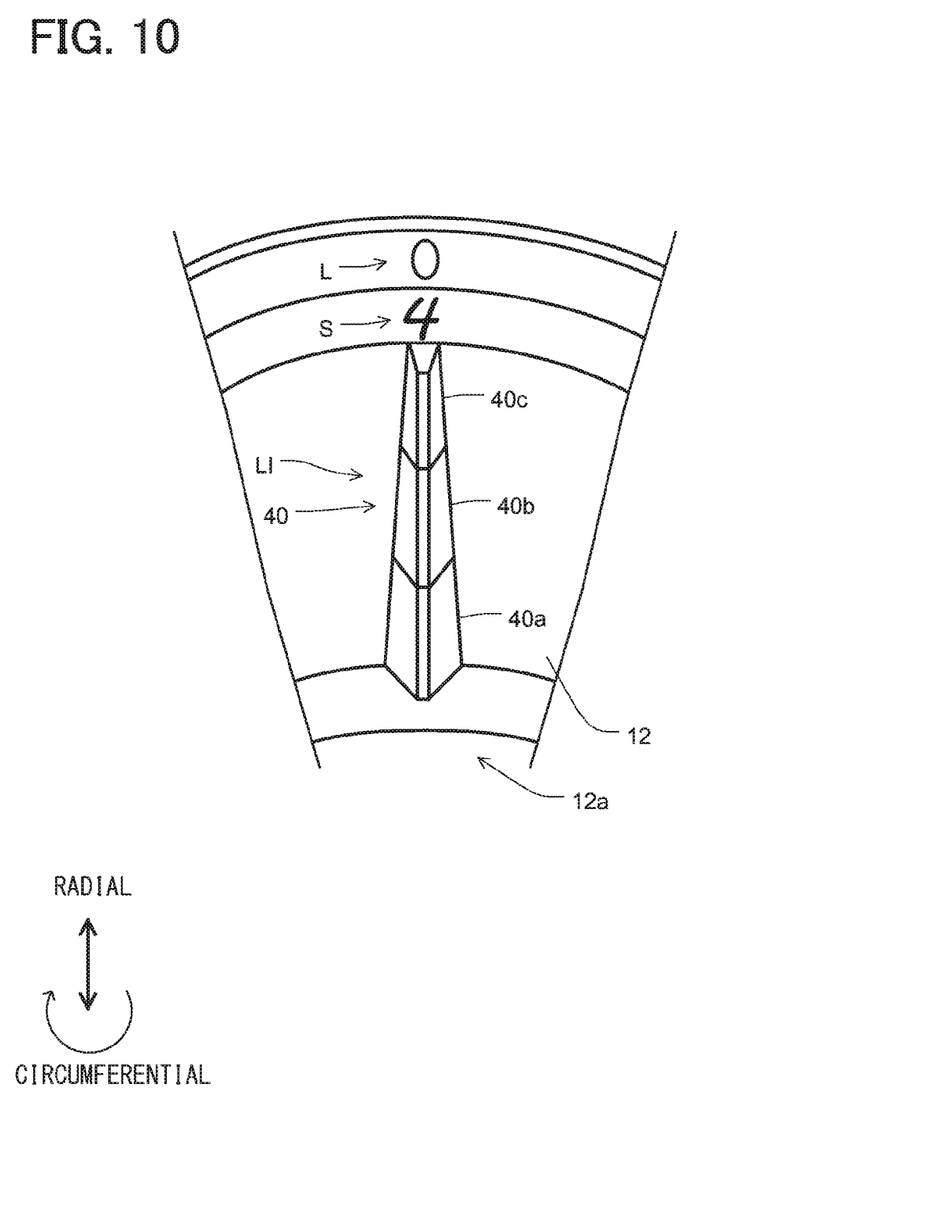
FIG. 10 is a perspective view showing another example of a groove.

It is noted that, the groove 40 may increase or decrease in width and/or depth in the radial direction. As shown in FIG. 10, in another example, the groove 40 decreases in both width and depth in the radial direction. In the example, the groove 40 may form the linear illumination IL in an acute shape.

Figure 11:
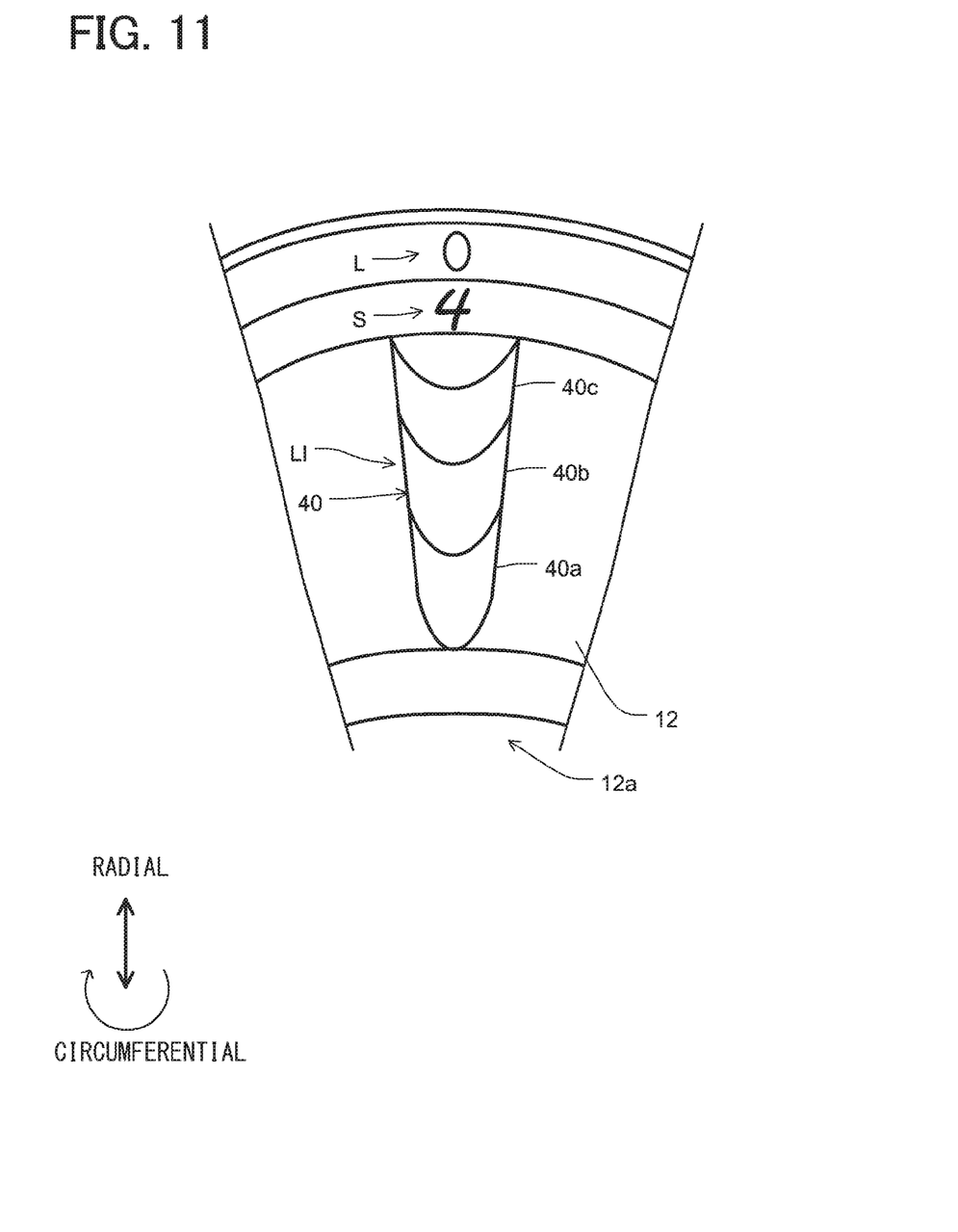
FIG. 11 is a perspective view showing another example of a groove.

It is noted that, the groove 40 may have a cross section in various shapes such as a V-shape, a rectangular shape, and/or a semicircular shape. As shown in FIG. 11, in another example, the groove 40 has a semicircular shape. In the example, the groove 40 increases in both width and depth in the radial direction. In the example, the groove 40 is not open to the groove-plate center hole 12a. Specifically, the groove 40 starts from the brim of the groove-plate center hole 12a.

Second Embodiment

Figure 12:
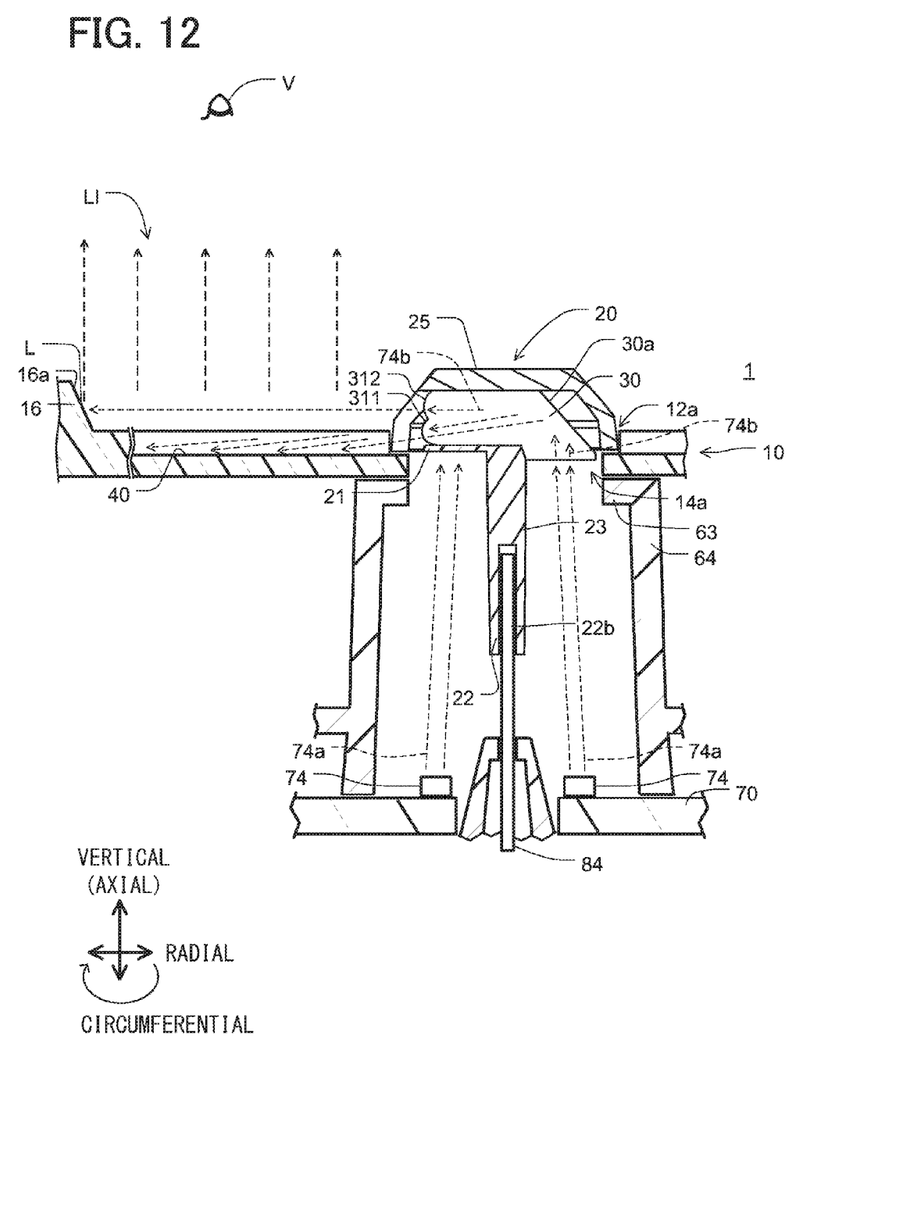
FIG. 12 is an explanatory view showing an indicating device of a second embodiment.

As shown in FIG. 12, according to the present embodiment, the tip end of the light conductor 30 has a first lens 311 and a second lens 312. The first lens 311 receives light reflected on the angled surface 30a and converges the light toward one of the grooves 40. The second lens 312 receives light reflected on the angled surface 30a and converges the light toward one of the light points L. In this way, the first lens 311 and the second lens 312 may direct light incident from the angled surface 30a toward the groove 40 and the light point L, separately.

Third Embodiment

Figure 13:
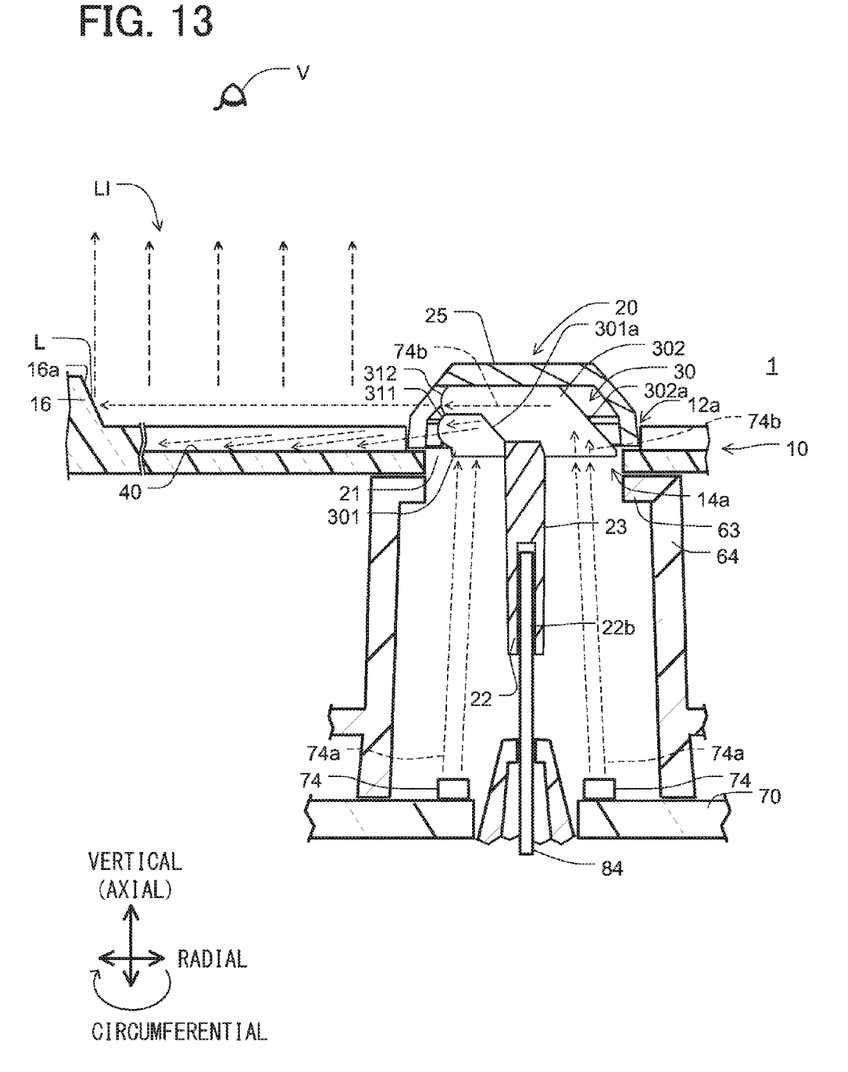
FIG. 13 is an explanatory view showing an indicating device of a third embodiment.

As shown in FIG. 13, according to the present embodiment, the light conductor 30 includes a first element 301 and a second element 302, which are optically isolated from each other. Specifically, the first element 301 and the second element 302 have a boundary therebetween, and the boundary is optically shielded by forming an opaque layer. The opaque layer may be formed by, for example, painting opaque pigment, plating a metallic material, and/or equipping a metallic foil. The first element 301 has a first angled surface 301a and the first lens 311. The second element 302 has a second angled surface 302a and the second lens 312. In the example, the first element 301 is not covered with the shield 21 (see FIG. 5) on the rear surface (bottom surface) and is opposed to the LEDs 74. That is, the first element 301 has a light pickup at the bottom portion.

The first element 301 receives light from the LEDs 74 and reflects the light on the first angled surface 301a to direct the light through the first lens 311 toward one of the groove 40. The second element 302 receives light from the LEDs 74 and reflects the light on the second angled surface 302a to direct the light through the second lens 312 toward one of the light points L.

Other Embodiments

The indicating device may be used in various control panels or instrument panels, such as a speedo meter, fuel meter, or mileage meter, other than the engine revolution meter.

The first segment 40a, the second segment 40b, and the third segment 40c may increase in reflectively in this order. The segments 40a to 40c may be different in color.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An indicating device comprising:
a dial plate in a disc shape; and
a pointer body located at a center of the dial plate and rotational relative to the dial plate, wherein
the dial plate has a plurality of grooves extending radially outward from the center, and
the pointer body is configured to emit light radially outward to illuminate one of the grooves to produce a linear illumination extending linearly outward from the pointer body.

2. The indicating device according to claim 1, wherein the grooves are arranged at angular intervals in a circumferential direction.

3. The indicating device according to claim 2, wherein:
the dial plate has a plurality of symbols arranged at angular intervals in the circumferential direction, and
the symbols S are located correspondingly to the grooves, respectively.

4. The indicating device according to claim 1, wherein
the grooves includes at least one primary groove and at least one secondary groove, and
the primary groove is greater than the secondary groove in width.

5. The indicating device according to claim 1, wherein at least one of the grooves has a cross section in one of a V-shape, a rectangular shape, and a curved shape.

6. The indicating device according to claim 1, wherein at least one of the grooves has a plurality of segments, and the segments are different in at least one of a reflectivity and a color.

7. The indicating device according to claim 1, wherein at least one of the grooves varies in at least one of a width and a depth in a radial direction.

8. The indicating device according to claim 1, wherein the dial plate has a center hole at the center, and
at least one of the grooves opens to the center hole.

9. The indicating device according to claim 1, wherein the dial plate includes a groove plate having the grooves, and the pointer body has a bottom portion located inside the center hole of the groove plate.

10. The indicating device according to claim 1, wherein the pointer body includes a light conductor being non-opaque and having an angled surface,
the light conductor is configured to receive light and to reflect the light on the angled surface to direct the light toward a tip end of the light conductor, and
the tip end is configured to emit the light toward one of the grooves.

11. The indicating device according to claim 10, wherein the pointer body includes a cover surrounding the light conductor, and
the cover has a slit through which the tip end is at least partially exposed.

12. The indicating device according to claim 10, further comprising:
a light source configured to emit light toward the light conductor; and
a controller configured to control the light source to modify intensity of light emitted from the light source to modify indication of the linear illumination.

13. The indicating device according to claim 12, wherein the light source is configured to modify the intensity of the light to modify a length of the linear illumination.

14. The indicating device according to claim 1, wherein the dial plate has a brim located on a radially outside of the dial plate,
the brim has an inclined surface raised relative to the dial plate and opposed to the pointer body, and
the inclined surface has a plurality of light points each configured to illuminate when receiving light emitted from the pointer body.

15. The indicating device according to claim 14, wherein the light points are located correspondingly to the grooves, respectively.

16. The indicating device according to claim 1, wherein the pointer body includes a light conductor being non-opaque and having an angled surface,
the light conductor is configured to receive light and to reflect the light on the angled surface to direct the light toward a tip end of the light conductor,
the tip end includes a first lens and a second lens,
the first lens is configured to receive light reflected on the angled surface and to direct the light toward one of the grooves, and
the second lens is configured to receive light reflected on the angled surface and to direct the light toward one of the light points.

17. The indicating device according to claim 1, wherein the pointer body includes a light conductor being non-opaque,
the light conductor includes a first element and a second element, which are optically isolated from each other,
the first element has a first angled surface and a first lens,
the second element has a second angled surface and a second lens,
the first element is configured to receive light and to reflect the light on the first angled surface to direct the light through the first lens toward one of the grooves, and
the second element is configured to receive light and to reflect the light on the second angled surface to direct the light through the second lens toward one of the light points.

* * * * *